United States Patent
Legg et al.

(10) Patent No.: US 10,659,994 B2
(45) Date of Patent: May 19, 2020

(54) NETWORK NODES, WIRELESS COMMUNICATION SYSTEM AND METHODS THEREOF

(71) Applicant: Huawei Technologies Co., Ltd., Shenzhen (CN)

(72) Inventors: Peter Legg, Kista (SE); Pablo Soldati, Kista (SE); Panagiotis Fotiadis, Kista (SE); Fan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/990,243

(22) Filed: May 25, 2018

(65) Prior Publication Data

US 2018/0279176 A1    Sep. 27, 2018

Related U.S. Application Data

(63) Continuation of application No. PCT/EP2015/077898, filed on Nov. 27, 2015.

(51) Int. Cl.
*H04W 28/12* (2009.01)
*H04L 12/801* (2013.01)
(Continued)

(52) U.S. Cl.
CPC .......... *H04W 28/10* (2013.01); *H04L 47/34* (2013.01); *H04L 47/41* (2013.01); *H04W 16/14* (2013.01);
(Continued)

(58) Field of Classification Search
CPC ........ H04L 47/34; H04L 47/41; H04W 16/14; H04W 28/10; H04W 76/15; H04W 28/065; H04W 28/0263; H04W 28/0205
See application file for complete search history.

(56) References Cited

U.S. PATENT DOCUMENTS

2013/0028117 A1* 1/2013 Montojo ............. H04L 5/001
                                                          370/252
2015/0188681 A1   7/2015 Li et al.
(Continued)

FOREIGN PATENT DOCUMENTS

EP    15801811.9      3/2020
WO   2015052545 A1   4/2015
(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 13),," 3GPP TS 36.423 V13.1.0, 3rd Generation Partnership Project, Valbonne, France (Sep. 2015).
(Continued)

*Primary Examiner* — Brian D Nguyen
(74) *Attorney, Agent, or Firm* — Leydig, Voit & Mayer, Ltd.

(57) ABSTRACT

The invention relates to a first network node and a second network node. The first network node being configured to communicate with a user device over at least two radio channels and comprising: a transceiver configured to receive a first sequence of data packets of a data flow addressed to the user device from a second network node; a processor configured to split the first sequence of data packets into at least one first sub-sequence of data packets and one second sub-sequence of data packets; wherein the transceiver further is configured to transmit the first sub-sequence of data packets in a first set of frequency resources over a first radio channel and the second sub-sequence of data packets in a second set of frequency resources over a second radio channel to the user device, wherein the first set of frequency
(Continued)

resources and the second set of frequency resources are non-overlapping.

10 Claims, 12 Drawing Sheets

(51) Int. Cl.
*H04L 12/891* (2013.01)
*H04W 16/14* (2009.01)
*H04W 28/10* (2009.01)
*H04W 76/15* (2018.01)
*H04W 28/06* (2009.01)
*H04W 28/02* (2009.01)

(52) U.S. Cl.
CPC ... *H04W 28/0205* (2013.01); *H04W 28/0263* (2013.01); *H04W 28/065* (2013.01); *H04W 76/15* (2018.02)

(56) References Cited

U.S. PATENT DOCUMENTS

| | | | |
|---|---|---|---|
| 2015/0215923 | A1 | 7/2015 | Jha et al. |
| 2016/0043844 | A1* | 2/2016 | Meylan ............... H04L 5/0048 370/315 |
| 2016/0057687 | A1* | 2/2016 | Horn .................. H04W 24/10 370/331 |
| 2016/0205578 | A1* | 7/2016 | Lee .................... H04W 24/10 |
| 2016/0219604 | A1 | 7/2016 | Fujishiro et al. |
| 2016/0286438 | A1* | 9/2016 | Weingertner ..... H04W 36/0022 |
| 2016/0302188 | A1 | 10/2016 | Lu et al. |
| 2017/0093530 | A1* | 3/2017 | Kudekar ............. H04L 1/0668 |
| 2017/0367141 | A1 | 12/2017 | Nagasaka et al. |
| 2018/0220303 | A1* | 8/2018 | Futaki ................ H04W 48/18 |
| 2018/0262233 | A1* | 9/2018 | Laselva ............... H04B 1/005 |
| 2018/0262930 | A1* | 9/2018 | da Silva .............. H04W 24/08 |

FOREIGN PATENT DOCUMENTS

| | | |
|---|---|---|
| WO | 2015063591 A2 | 5/2015 |
| WO | 2015096088 A1 | 7/2015 |
| WO | 2015115573 A1 | 8/2015 |
| WO | 2015115860 A1 | 8/2015 |
| WO | 2015116387 A1 | 8/2015 |
| WO | 2016143560 A1 | 9/2016 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 13)," 3GPP TS 36.300 V13.1.0, 3rd Generation Partnership Project, Valbonne, France (Sep. 2015).

"Consideration on the simultaneously configuration of LTE/WLAN aggregation and Dual Connectivity," 3GPP TSG-RAN WG2 meeting #89bis R2-151096, Bratislava, Slovakia, 3rd Generation Partnership Project, Valbonne, France (Apr. 20-24, 2015).

"3rd Generation Partnership Project;Technical Specification Group Radio Access Network; Study on Wireless Local Area Network (WLAN)—3GPP radio interworking (Release 12)," 3GPP TR 37.834 V12.0.0, 3rd Generation Partnership Project, Valbonne, France (Dec. 2013).

"Scenario and Protocol architecture of LTE-WLAN aggregation," 3GPP TSG-RAN WG2 #89-bis R2-151538, Bratislava, Slovakia, 3rd Generation Partnership Project, Valbonne, France (Apr. 20-24, 2015).

"Comparison of the UP Alternatives," 3GPP TSG-RAN WG2#83, Barcelona, Spain, R2-132992, 3rd Generation Partnership Project, Valbonne, France (Aug. 19-23, 2013).

Alkhansa et al.,"LTE-WiFi Carrier Aggregation for Future 5G Systems: A Feasibility Study and Research Challenges," The 9th International Conference on Future Networks and Communications (FNC-2014), pp. 133-140, Elsevier B.V., (2017).

"Discussion on RRC signalling via SeNB,", 3GPP TSG-RAN2 Meeting #84, San Francisco, USA, R2-134005, pp. 1-3, 3rd Generation Partnership Project, Valbonne, France (Oct. 11-15, 2013).

* cited by examiner

NETWORK NODES, WIRELESS COMMUNICATION SYSTEM AND METHODS THEREOF

CROSS-REFERENCE TO RELATED APPLICATIONS

This application is a continuation of International Application No. PCT/EP2015/077898, filed on Nov. 27, 2015, which is incorporated herein by reference in its entirety.

TECHNICAL FIELD

The invention relates to a first network node and a second network node for wireless communication systems. Furthermore, the invention also relates to corresponding methods, a wireless communication system, a user device, a computer program, and a computer program product.

BACKGROUND

Fueled by the increased popularity of more capable devices (such as smart-phones, tablets, etc.), mobile broadband is experiencing an exponential growth. To effectively handle the data explosion challenge, Heterogeneous Network (HetNet) deployments have emerged as the key network evolution path. In such deployment paradigm, low-power small cells are envisaged to boost capacity at hotspot areas, whilst wide area connectivity is provided by the macro overlay. Particularly, small cell operation at license-exempt frequency bands has gained significant momentum during the last years. This is driven by the sparse availability of new licensed spectrum, making IEEE 802.11 Wireless Local Area Networks (WLAN) a cost-effective solution for complementing 3GPP 3G/4G networks. In this context, the existing massively deployed WLAN infrastructure and the high WLAN penetration of User Equipment (UE) devices provide excellent opportunities for offloading cellular traffic to WLAN. Current devices commonly support a rather simplistic offloading scheme by blindly attaching to WLAN, whenever possible. However, such mechanisms often result in noticeable throughput degradation after switching to WLAN. The reason is due to the Medium Access Control (MAC) nature of WLAN systems where network nodes (in downlink) and users (in uplink) have to compete for occupying the transmission channel. This essentially calls for the design of smart offloading schemes that opportunistically exploit WLAN without jeopardizing user experience.

Two new paradigms have appeared in recent years to advance the performance of these HetNets, namely: Link Aggregation (LA) and Dual Connectivity (DC). These exploit the fact that the user device supports two (or more) radios which can operate at the same time. For example, the user device could operate two Long-Term Evolution (LTE) radios (on different frequencies) at the same time, or LTE and WiFi.

In link aggregation, a stream of data packets can be split and delivered over two links operating simultaneously. The aggregate throughput is the sum of the throughput on each link.

In dual connectivity, there is an anchor node (for example, an LTE Evolved Node B (eNB)) that provides wide area coverage and signaling connectivity, whilst subtended small cells provide high bandwidth user plane links to users. Small cells of different Radio Access Technologies (RATs) and using different spectrum (including unlicensed spectrum) may be attached to the anchor node.

In 3GPP Release 12 (R12) and currently in Release 13 (R13), different realizations of these concepts have or are being standardized. In R12 LTE Dual Connectivity was introduced and in R13 there are work items to standardize (i) LTE/WLAN Aggregation (LWA) and (ii) License Assisted Access (LAA) to aggregate licensed and unlicensed LTE carriers.

SUMMARY

An objective of embodiments of the invention is to provide a solution which mitigates or solves the drawbacks and problems of conventional solutions.

The above objectives and further objectives are achieved by the subject matter of the independent claims. Further advantageous implementation forms of the invention are defined by the dependent claims.

According to a first aspect of the invention, the above mentioned and other objectives are achieved with a wireless communication system comprising a first network node and a second network node;
wherein the second network node is configured to have a
  Radio Resource Control (RRC) connection to a user device, and the second network node comprises:
a transceiver configured to
  receive a data flow comprising data packets addressed to the user device;
a processor configured to
  determine at least one first sequence of data packets of the data flow addressed to the user device,
  determine that the first network node is configured to communicate with the user device over at least two radio channels;
wherein the transceiver further is configured to
  to the first network node if the first network node has at least two radio channels for communication with the user device;
and the first network node comprises:
a transceiver configured to
  receive the first sequence of data packets from the second network node; a processor configured to
  split the first sequence of data packets into at least one first sub-sequence of data packets and one second sub-sequence of data packets;
wherein the transceiver further is configured to
  transmit the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

A number of advantages are provided by a wireless communication system according to the first aspect.

One such advantage is that the wireless communication system according to the first aspect enables the second network node to split a data flow addressed to a user device into multiple sequences of data packets to be delivered to the user device either by the first network node or by the second network node, thereby improving control over the data traffic steering addressed to the user device.

One such additional advantage is that the first network node can further split a sequence of data packets addressed to the user device into multiple sub-sequences of data packets and transmit each subsequence over separate radio channels based on the corresponding radio conditions. Thereby spectral efficiency can be improved. An additional advantage is that by transmitting two data sub-streams concurrently over two radio channels, the peak data rate experience by the user device is improved.

Furthermore, the wireless communication system according to the first aspect enables the second network node to split a data flow addressed to a user device into at least one sequence of data packets to be delivered to the user device by a first network node with good connection to the user device, thereby improving spectral efficiency. An additional advantage is that the second network node is enabled to control and steer the traffic load addressed to the user device so as to improve the data rate experienced by the user device.

According to a second aspect of the invention, the above mentioned and other objectives are achieved with a first network node for a wireless communication system, the first network node being configured to communicate with a user device over at least two radio channels and comprising:

a transceiver configured to receive a first sequence of data packets of a data flow addressed to the user device from a second network node;

a processor configured to split the first sequence of data packets into at least one first sub-sequence of data packets and one second sub-sequence of data packets;

wherein the transceiver further is configured to transmit the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

The first network node is configured to communicate with a user device over two radio channels comprising non-overlapping frequency resources within two radio channels which means that two data sub-streams can be transmitted to the user device in parallel or concurrently over different radio channels. The term radio channel is hereafter used to indicate, for example, either a radio communication channel comprising a portion of (or the entire) frequency spectrum within a frequency band or a frequency component carrier. For example, the first radio channel may be a channel of an unlicensed frequency band, whilst the second radio channel may be a frequency component carrier of a licensed spectrum band. Furthermore, the term radio channel may be used in relation to a radio connection between the user device and a network node, such as a radio data link.

The data flow addressed to the user device is a sequence of data packets for the user device. In one exemplifying case, the data flow represents a radio bearer addressed to the user device.

A number of advantages are provided by a first network node according to the first aspect.

One such advantage is that the first network node can split a sequence of data packets addressed to the user device into multiple sub-sequences of data packets and transmit the individual sub-sequences over different radio channels based on the corresponding radio conditions. Thereby spectral efficiency can be improved. An additional advantage is that by transmitting two data sub-streams concurrently over two radio channels, the peak data rate experience by the user device is improved.

In a first possible implementation form of a first network node according to the second aspect, the data flow is addressed to the user device being configured to have a Radio Resource Control, RRC, connection to the second network node.

An advantage of the first possible implementation form is that this allows simultaneous data delivery over two or more radio channels to the user device from the first network node whilst maintaining an anchored control plane connection (the RRC connection) to the second network node to allow seamless mobility over the wireless communication system. Therefore, control signaling for supporting user mobility is reduced.

In a second possible implementation form of a first network node according to the first possible implementation form of the second aspect or to the second aspect as such, the transceiver further is configured to receive at least one RRC measurement report from the second network node, the RRC measurement report being associated with at least one radio channel between the user device and the first network node;

wherein the processor further is configured to split the first sequence of data packets based on the received RRC measurement report.

An advantage of the second possible implementation form is that the first network node can optimize the split of the sequence of data packet into at least two sub-sequences based on the radio channel conditions wherein the sub-sequences are transmitted. Thereby spectral efficiency is improved. In addition, by receiving the RRC measurement report from the second network node additional signaling overhead between the first network node and the user device is avoided.

In a third possible implementation form of a first network node according to the second possible implementation form of the second aspect, at least one radio channel comprises frequency resources in an unlicensed band and the RRC measurement report comprises at least one of WLAN measurements, unlicensed LTE measurements, and LTE measurements.

An advantage of the third possible implementation form is that a single RRC measurement report can be exchanged between the second network node and the first network node to report measurements related to radio channels on both unlicensed and licensed frequency bands. Additionally, this allows to simultaneously transmitting data packets to the user device over two or more radio channels from the second network node whilst maintaining an anchored control plane connection to the second network node to allow seamless mobility over the wireless communication system. Therefore, control signaling for supporting user mobility is reduced.

In a fourth possible implementation form of a first network node according to any of the preceding possible implementation forms of the second aspect, the first sequence of data packets is a fraction of all data packets of the data flow.

By fraction of all data packets of the data flow it is meant the first sequence of data packets comprises some data packets of the data flow addressed to the user device.

An advantage of the fourth possible implementation form is that a fraction of the data flow addressed to the user device can be delivered by the first network node while the remaining part of the data flow can be delivered by the second network node. This allows to simultaneously transmitting data packets to the user device over two or more radio channels from both the first and the second network node, thereby improving spectral efficiency.

In a fifth possible implementation form of a first network node according to any of the preceding possible implementation forms of the second aspect, the transceiver further is configured to receive the first sequence of data packets over a backhaul link (having a latency either greater than or lower than a threshold value).

The backhaul link is a communication link between network nodes backhaul technologies, such as radio and copper (digital subscriber line (DSL), cable) may be used, or fiber to reduce latency between the network nodes. A radio channel can also be used to provide a backhaul link for communication between network nodes. The backhaul link has a latency and in yet another implementation form the latency either greater than or lower than a threshold value which may be defined in a communication standard. For example, if the latency is greater than a threshold the first network node and the second network node are not considered to be co-located. On the other hand if the latency is less than the threshold the first network node and the second network node are considered to be co-located.

An advantage of the fifth possible implementation form is that it enables the sequence of data packets addressed to the user device can be received by the first network node with controlled latency.

In a sixth possible implementation form of a first network node according to any of the preceding possible implementation forms of the second aspect, the transceiver further is configured to transmit the first sub-sequence of data packets and the second sub-sequence of data packets concurrently over the first radio channel and the second radio channel, respectively.

The first network node can split a sequence of data packets addressed to the user device into multiple sub-sequences of data packets and transmit the individual sub-sequences over different radio channels based on the corresponding radio conditions. Thereby, spectral efficiency can be improved. An additional advantage is that by transmitting two data sub-streams concurrently over two radio channels, the peak data rate experience by the user device is improved.

In a seventh possible implementation form of a first network node according to any of the preceding possible implementation forms of the second aspect, the split of the first sequence of data packets comprises splitting all data packets of the first sequence of data packets into either the first sub-sequence of data packets or the second sub-sequence of data packets.

An advantage of the seventh possible implementation form is that the first network node can split a sequence of data packets addressed to the user device into multiple sub-sequences of data packets and transmit the individual sub-sequences over different radio channels based on the corresponding radio conditions. Thereby, when a radio channel experiences bad channel conditions, the entire sequence of data packet is transmitted over a single radio channel to improve spectral efficiency.

In an eighth possible implementation form of a first network node according to any of the preceding possible implementation forms of the second aspect, the processor further is configured to split the first sequence of data packets using the Packet Data Convergence Protocol.

An advantage of the eighth possible implementation form is that the flow of data packets addressed to the user device can efficiently be steered between the first network node and the second network node.

In a ninth possible implementation form of a first network node according to any of the preceding possible implementation forms of the second aspect, the first sub-sequence of data packets is configured to transmit using a first Radio Access Technology (RAT) over the first radio channel and the second sub-sequence of data packets is configured to transmit using a second RAT over the second radio channel.

An advantage of the ninth possible implementation form is that it enabled to transmit the sequence of data packets over different RATs, thereby exploiting the RAT diversity to improve spectral efficiency.

In a tenth possible implementation form of a first network node according to the ninth possible implementation form of the second aspect, the first RAT operates in a licensed spectrum band and the second RAT operates in an unlicensed spectrum band, or vice versa.

An advantage of the tenth possible implementation form is that it enables to transmit the sequence of data packets over different RATs and type of spectrum bands, thereby exploiting the RAT and spectrum diversity to improve further spectral efficiency.

In a eleventh possible implementation form of a first network node according to the tenth possible implementation form of the second aspect, the first RAT is a 3GPP RAT and the second RAT is a Wireless Local Area Network (WLAN) or vice versa.

An advantage of the eleventh possible implementation form is that it enables tight interworking between a 3GPP RAT and a Wireless Local Area Network (WLAN) RAT, thereby improving the service provided to the user device. An additional advantage of this implementation form is that it enables a 3GPP RAT to control and coordinate the transmission of a WLAN RAT, thereby improving the data rate provided to the user device.

In a twelfth possible implementation form of a first network node according to the eleventh possible implementation form of the second aspect, the radio channel using WLAN only carries downlink user plane data.

An advantage of the twelfth possible implementation form is that it enables to reduce the contention to access the radio channel using WLAN, thereby improving spectral efficiency.

According to a third aspect of the invention, the above mentioned and other objectives are achieved with a second network node for a wireless communication system, the second network node being configured to have a RRC connection to a user device and comprising:
a transceiver configured to
    receive a data flow comprising data packets addressed to the user device; a processor configured to
    determine at least one first sequence of data packets of the data flow addressed to the user device,
    determine at least one first network node configured to communicate with the user device over at least two radio channels;
wherein the transceiver further is configured to
    to the first network node if the first network node has at least two radio channels for communication with the user device.

A number of advantages are provided by a second network node according to the third aspect.

An advantage of the third aspects is that it enables the second network node to split a data flow addressed to a user device into at least one sequence of data packets to be delivered to the user device by a first network node with good connection to the user device, thereby improving spectral efficiency. An additional advantage is that the second network node is enabled to control and steer the traffic load addressed to the user device so as to improve the data rate experienced by the user device.

In a first possible implementation form of a second network node according to the third aspect, the processor further is configured to determine at least one second sequence of data packets of the data flow addressed to the user device; wherein the transceiver further is configured to transmit the second sequence of data packets to the user device in a third set of frequency resources over a third radio channel.

An advantage the first possible implementation form is that it enables the second network node to split a data flow addressed to a user device into multiple sequences of data packets to be delivered to the user device either by the first network node or by the second network node. Thereby, the second network node is enabled to control and steer the data traffic addressed to the user device among multiple connections so as to improve the data rate experienced by the user device. In particular, at least three connections are determined and maintained with the user device (one with the second network node, and two with the first network node). Thereby this implementation form allows to simultaneously transmitting data packets to the user device over two or more radio channels from the first network node, the second network node or both, thereby improving spectral efficiency.

In a second possible implementation form of a second network node according to the first possible implementation form of the third aspect or to the third aspect as such, the transceiver further is configured to receive at least one RRC measurement report from the user device, wherein the RRC measurement report is associated with at least one radio channel between the user device and the first network node, forward the RRC measurement report to the first network node.

In one alternative of the second possible implementation form, the RRC measurement report is transmitted to the first network node over a backhaul link.

An advantage of the second possible implementation form is that this allows to simultaneously transmitting data packets to the user device over two or more radio channels from the first and second network nodes whilst maintaining an anchored control plane connection to the second network node to allow seamless mobility over the wireless communication system. Therefore, control signaling for supporting user mobility is reduced.

In a third possible implementation form of a second network node according to the first or second possible implementation forms of the third aspect or to the third aspect as such, the transceiver further is configured to transmit an instruction to the user device to monitor and receive a first sequence of data packets from the first network node over a first radio channel or over a second radio channel.

An advantage of the third possible implementation form is that this enables to maintain an anchored control plane connection to the second network node while data is received from a first network node to allow seamless mobility over the communication system. Therefore, control signaling for supporting user mobility is reduced when the user device receives data plane from the first network node and the second network node.

In a fourth possible implementation form of a second network node according to any of the preceding possible implementation forms of the third aspect or to the third aspect as such, the transceiver further is configured to transmit the first sequence of data packets over a backhaul link having a latency either greater than or lower than a threshold value.

An advantage of the fourth possible implementation form is that it enables the sequence of data packets addressed to the user device to be received by the first network node with controlled latency.

According to a fourth aspect of the invention, the above mentioned and other objectives are achieved with a user device for a wireless communication system, the user device comprising a transceiver configured to:

maintain a RRC connection to a second network node;

receive at least one first sub-sequence of data packets and one second sub-sequence of data packets of a first sequence of data packets of a data flow addressed to the user device from a first network node, wherein the first sub-sequence of data packets is received in a first set of frequency resources over a first radio channel and the second sub-sequence of data packets is received in at least one second set of frequency resources over a second radio channel, wherein the first set of frequency resources and the second set of frequency resources are non-overlapping.

In a first possible implementation form of a user device according to the fourth aspect, the transceiver further is configured to receive a second sequence of data packets of the data flow from the second network node in a third set of frequency resources over a third radio channel, wherein the third set of frequency resources is non-overlapping with the first set of frequency resources and the second set of frequency resources.

In a second possible implementation form of a user device according to the first possible implementation form of the fourth aspect or to the first aspect as such, the transceiver further is configured to perform radio channel measurements on any of the first radio channel and the second radio channel;

wherein the user device further comprises a processor configured to determine at least one RRC measurement report based on the radio channel measurements;

wherein the transceiver further is configured to transmit the RRC measurement report to the second network node.

According to a fifth aspect of the invention, the above mentioned and other objectives are achieved with a method for a wireless communication system comprising a first network node being configured to communicate with a user device over at least two radio channels, and a second network node having a RRC connection to the user device; the method comprising:

receiving, by the second network node, a data flow comprising data packets addressed to the user device;

determining, by the second network node, at least one first sequence of data packets of the data flow addressed to the user device, is configured to communicate with the user device over at least two radio channels;

transmitting, by the second network node, the first sequence of data packets to the first network node if the first network node has at least two radio channels for communication with the user device;

receiving, by the first network node, the first sequence of data packets from the second network node;

splitting, by the first network node, the first sequence of data packets into at least a first sub-sequence of data packets and a second sub-sequence of data packets;

transmitting, by the first network node, the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

Being configured to communicate with a user device over at least two radio channels, the method comprising:

receiving a first sequence of data packets of a data flow addressed to the user device from a second network node;

splitting the first sequence of data packets into at least one first sub-sequence of data packets and one second sub-sequence of data packets;

transmitting the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

In a first possible implementation form of a method according to the sixth aspect, the data flow is addressed to the user device being configured to have a Radio Resource Control (RRC) connection to the second network node.

In a second possible implementation form of a method according to the first possible implementation form of the sixth aspect or to the sixth aspect as such, the method further comprises receiving at least one RRC measurement report from the second network node, the RRC measurement report being associated with at least one radio channel between the user device and the first network node;

splitting the first sequence of data packets based on the received RRC measurement report.

In a third possible implementation form of a method according to the second possible implementation form of the sixth aspect, at least one radio channel comprises frequency resources in an unlicensed band and the RRC measurement report comprises at least one of WLAN measurements, unlicensed LTE measurements, and LTE measurements.

In a fourth possible implementation form of a method according to any of the preceding possible implementation forms of the sixth aspect, the first sequence of data packets is a fraction of all data packets of the data flow.

In a fifth possible implementation form of a method according to any of the preceding possible implementation forms of the sixth aspect, the method further comprises receiving the first sequence of data packets over a backhaul link (having a latency either greater than or lower than a threshold value).

In a sixth possible implementation form of a method according to any of the preceding possible implementation forms of the sixth aspect, the method further comprises transmitting the first sub-sequence of data packets and the second sub-sequence of data packets concurrently on the first radio channel and the second radio channel, respectively.

In a seventh possible implementation form of a method according to any of the preceding possible implementation forms of the sixth aspect, the splitting of the first sequence of data packets comprises splitting all data packets of the first sequence of data packets into either the first sub-sequence of data packets or the second sub-sequence of data packets.

In an eighth possible implementation form of a method according to any of the preceding possible implementation forms of the sixth aspect, the method further comprises splitting the first sequence of data packets using the Packet Data Convergence Protocol.

In a ninth possible implementation form of a method according to any of the preceding possible implementation forms of the sixth aspect, the first sub-sequence of data packets is transmitted using a first Radio Access Technology (RAT) over the first radio channel and the second sub-sequence of data packets is transmitted using a second RAT over the second radio channel.

In a tenth possible implementation form of a method according to the ninth possible implementation form of the sixth aspect, the first RAT operates in a licensed spectrum band and the second RAT operates in an unlicensed spectrum band, or vice versa.

In a eleventh possible implementation form of a method according to the tenth possible implementation form of the sixth aspect, the first RAT is a 3GPP RAT and the second RAT is a Wireless Local Area Network (WLAN) or vice versa.

In a twelfth possible implementation form of a method according to the eleventh possible implementation form of the sixth aspect, the radio channel using WLAN only carries downlink user plane data.

According to a seventh aspect of the invention, the above mentioned and other objectives are achieved with a method for a second network node having a RRC connection to a user device, the method comprising:

receiving a data flow comprising data packets addressed to the user device;

determining at least one first sequence of data packets of the data flow addressed to the user device, determining at least one first network node configured to communicate with the user device over at least two radio channels;

channels for communication with the user device.

In a first possible implementation form of a method according to the seventh aspect, the method further comprises determining at least one second sequence of data packets of the data flow addressed to the user device;

transmitting the second sequence of data packets to the user device in a third set of frequency resources over a third radio channel.

In a second possible implementation form of a method according to the first possible implementation form of the seventh aspect or to the seventh aspect as such, the method further comprises receiving at least one RRC measurement report from the user device, wherein the RRC measurement report is associated with at least one radio channel between the user device and the first network node, forwarding the RRC measurement report to the first network node.

In a third possible implementation form of a method according to the first or second possible implementation forms of the seventh aspect, the method further comprises transmitting an instruction to the user device to monitor and receive a first sequence of data packets from the first network node over a first radio channel or over a second radio channel.

In a fourth possible implementation form of a method according to any of the preceding possible implementation forms of the seventh aspect or to the seventh aspect as such, the method further comprises transmitting the first sequence of data packets over a backhaul link having a latency either greater than or lower than a threshold value.

According to an eighth aspect of the invention, the above mentioned and other objectives are achieved with a method for a user device, the method comprising maintaining a RRC connection to a second network node;

receiving at least one first sub-sequence of data packets and one second sub-sequence of data packets of a first sequence of data packets of a data flow addressed to the user device from a first network node, wherein the first sub-sequence of data packets is received in a first set of frequency resources over a first radio channel and the second sub-sequence of data packets is received in at least one second set of frequency resources over a second radio channel, wherein the first set of frequency resources and the second set of frequency resources are non-overlapping.

In a first possible implementation form of a method according to the fourth aspect, the method further comprising receiving a second sequence of data packets of the data flow from the second network node in a third set of frequency resources over a third radio channel, wherein the third set of frequency resources is non-overlapping with the first set of frequency resources and the second set of frequency resources.

In a second possible implementation form of a method according to the first possible implementation form of the fourth aspect or to the first aspect as such, the method further comprising performing radio channel measurements on any of the first radio channel and the second radio channel;

determining at least one RRC measurement report based on the radio channel measurements;

transmitting the RRC measurement report to the second network node.

The advantages of the methods according to any of the fifth to eighth aspects are the same as the corresponding network nodes, user device and wireless communication system.

Embodiments of the invention also relates to a computer program, characterized in code means, which when run by processing means causes said processing means to execute any method according to the invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the invention will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
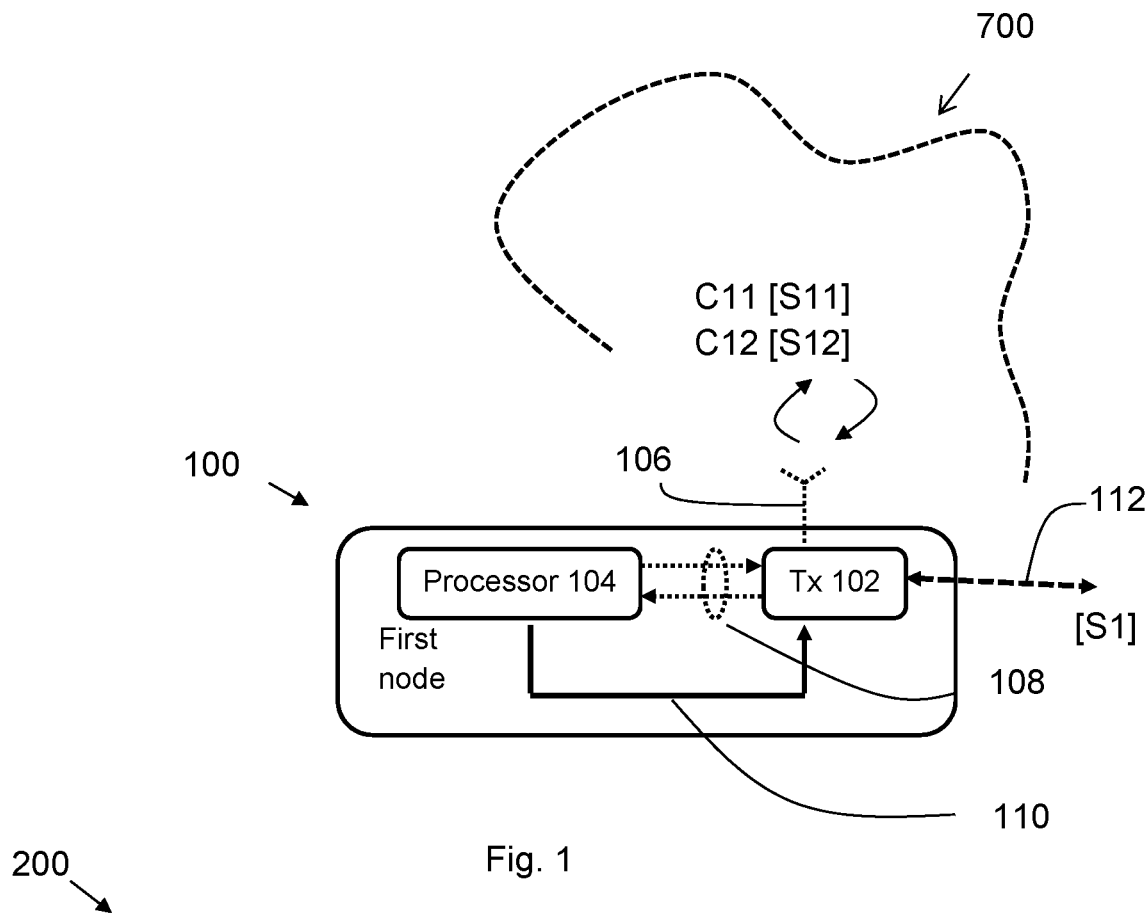
FIG. 1 shows a first network node according to an embodiment of the invention.

In LTE DC, a UE maintains two downlink radio links, one to a macro eNB (operating at frequency f1) and one to a pico eNB (at f2). Thereby, the two downlink radio links are in other words maintained over two radio channels operating at different frequencies. The eNBs are connected by non-ideal backhaul to each other, meaning that packet transmissions incur a delay of tens of milliseconds. Control signaling is sent only to the macro eNB which means that the UE can move under the coverage of the LTE macro cell without incurring any layer 3 RRC handover events. The uplink user plane of the UE is sent on either the macro link or the pico link, whilst the downlink user plane has the additional option of being split and using both links (link aggregation). The downlink user plane bearer splitting occurs at the Packet Data Convergence Protocol (PDCP) protocol layer such that PDCP Packet Data Units (PDUs) are sent either from the macro or forwarded over the X2 interface to the pico. The pico eNB queues the PDCP PDUs and determines when to schedule their transmissions. Since PDCP PDUs may arrive out-of-sequence at the UE, the PDCP layer there includes reordering functionality. In 3GPP terminology the eNB anchoring the RRC of a user is called the MeNB (Master eNB, the macro in our example for the LTE DC UE) and the other eNB is called the SeNB (Secondary eNB, the pico eNB).

For LTE/WLAN interworking, Rel-12 specifications have introduced an Access Network Selection (ANS) mechanism for LTE/WLAN traffic steering. The UE offloading decision is taken by based on assistance parameters that are provided by the cellular network. In that sense, decision thresholds with respect to signal strength/quality, load, etc. determine the condition to be met for steering traffic from or to WLAN. Additional integration enhancements are currently considered for standardization in LTE Rel-13. These include fully network-controlled LTE/WLAN traffic steering (also known as LTE WLAN Interworking, LWI) or even downlink LTE-WLAN Aggregation (LWA) that allows UEs to concurrently receive data from both LTE and WLAN. The LWA design draws many aspects from LTE DC. To improve the capacity of the downlink WiFi, the uplink WiFi MAC control frames are sent over LTE (encapsulated by the RRC protocol), and no uplink user plane is mapped to WiFi.

Further, LWA is being standardized with two architectures, namely co-located and non co-located. In the LWA non co-located architecture, the LTE eNB and WiFi node (this could for example be an Access Point (AP) or an AP controller) are connected by non-ideal backhaul. The UE is held in RRC connected mode. By means of the backhaul, WLAN load conditions can be reported to the LTE network, whilst physical layer measurements performed by the UE for both RATs (WLAN and LTE) are sent in uplink using the always-on RRC connection. Exploiting such measurements, the LTE base station can select WLAN offloading UE candidates and send them the associated steering command via RRC signaling. It is worth mentioning that the UE's user plane can be also served by the WLAN alone. This is LTE-WLAN interworking (LWI). In LWA, the UE can be configured with a WLAN Secondary Cell (SCell) enabling the concurrent downlink data reception from both RATs. The procedure is still network-controlled, however it involves different signaling compared to LWI. The user data plane is split at the PDCP layer of the LTE node and the amount of data forwarded over each RAT can be derived based on the LTE/WLAN radio conditions on, network node loading, flow control messages, etc. Among others, LWA offers a more stable data connection as the UE can still receive data on the LTE link even if its WLAN connectivity is lost. On the other hand, it increases UE power consumption since the UE essentially has to process data from both links.

In the LWA co-located architecture, the eNB and WLAN device (e.g. AP) are implemented in the same box, or are linked by an ideal backhaul connection, meaning latency much less than 1 ms, e.g. a fiber link. The RRC control connection is terminated at the co-located eNB. This is true even if the co-located device is a small cell node and there exists an overlay network made from macro cells. The splitting of data packets is decided by the so-called PDCP Scheduler, which determines to send PDCP PDUs down one link or the other. In the co-located pico and AP joint scheduling or coordinated/coupled scheduling can give significant performance gains by exploiting variations in the loading of the cells and radio conditions of the users. For example, when the pico load momentarily drops, PDCP PDUs can be sent over the pico air interface in addition to over WiFi. For example, if a UE suffers sudden interference in the unlicensed band, its traffic can be routed onto the pico cell. To support this joint scheduling it is important to know the radio conditions (such as path loss, interference level) in both pico and AP for LWA users. Since, there is preferably no WLAN uplink to carry uplink management information (or user plane data), this information is obtained using RRC signaling, direct to the pico cell since RRC is terminated there.

FIG. 1 shows a first network node 100 according to an embodiment of the invention. The first network node 100 comprises a processor 104 which is communicably coupled with communication means 108 to a transceiver 102 in this exemplary embodiment. The communication means 108 are illustrated as dotted arrows between the processor 104 and the transceiver 102 in FIG. 1. The communication means 108 are according to techniques well known in the art and may e.g. be used for transfer of data or control signaling between the processor 104 and the transceiver 102. The first network node 100 in this particular embodiment further comprises control means 110 by which the processor 104 operates (or controls) the transceiver 102. The control means 110 are illustrated with the black arrow from the processor 104 to the transceiver 102. The first network node 100 also comprises antenna means 106 coupled to the transceiver 102 for transmission and reception in the wireless communication system 700. The first network node 100 may also optionally have wired communication means 112 by which the first network node 100 can communicate with other network nodes or other network entities. The wired communication means 112 may e.g. be part of a backhaul system of the wireless communication system 700.

According to the present solution, the first network node 100 is configured to communicate with a user device 500 (e.g. shown in FIGS. 5 and 7) of a wireless communication system 700 over at least two radio channels. The transceiver 102 of the first network node 100 is configured to receive a first sequence of data packets S1 of a data flow addressed to the user device 500 from a second network node 300. The first sequence of data packets S1 is in this particular example received via the wired communication means 112. It is however noted that the first sequence of data packets S1 may be received from the second network node 300 over a wireless transmission protocol.

The processor 104 of the first network node 100 is configured to split the first sequence of data packets S1 into at least one first sub-sequence of data packets S11 and one second sub-sequence of data packets S12. The transceiver 102 is further configured to transmit the first sub-sequence of data packets S11 in a first set of frequency resources over a first radio channel C11 and the second sub-sequence of data packets S12 in a second set of frequency resources over a second radio channel C12 to the user device 500. The first set of frequency resources and the second set of frequency resources are non-overlapping.

Figure 2:
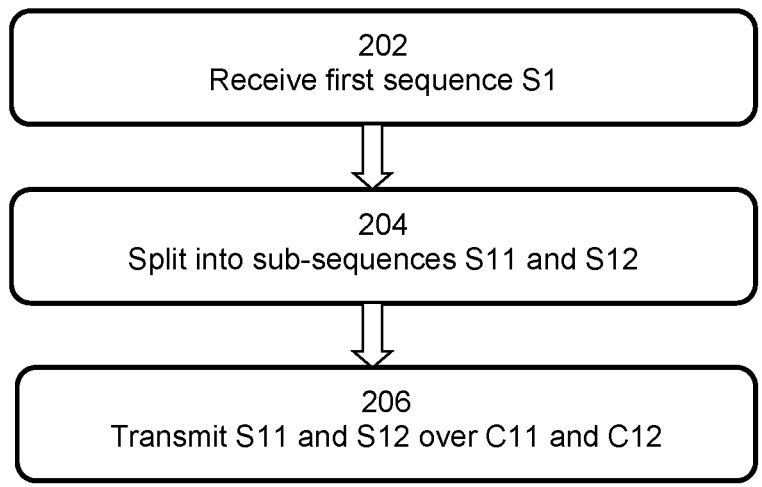
FIG. 2 shows a method according to an embodiment of the invention.

FIG. 2 shows a corresponding method which may be implemented in a first network node 100, such as the one shown in FIG. 1. The method 200 comprises the step of receiving 202 a first sequence of data packets S1 of a data flow from a second network node 300. The method 200 further comprises the step of splitting 204 the first sequence of data packets S1 into at least one first sub-sequence of data packets S11 and one second sub-sequence of data packets S12. The method 200 further comprises the step of transmitting 206 the first sub-sequence of data packets S11 in a first set of frequency resources over a first radio channel C11 and the second sub-sequence of data packets S12 in a second set of frequency resources over a second radio channel C12. The first set of frequency resources and the second set of frequency resources are non-overlapping.

Figure 3:
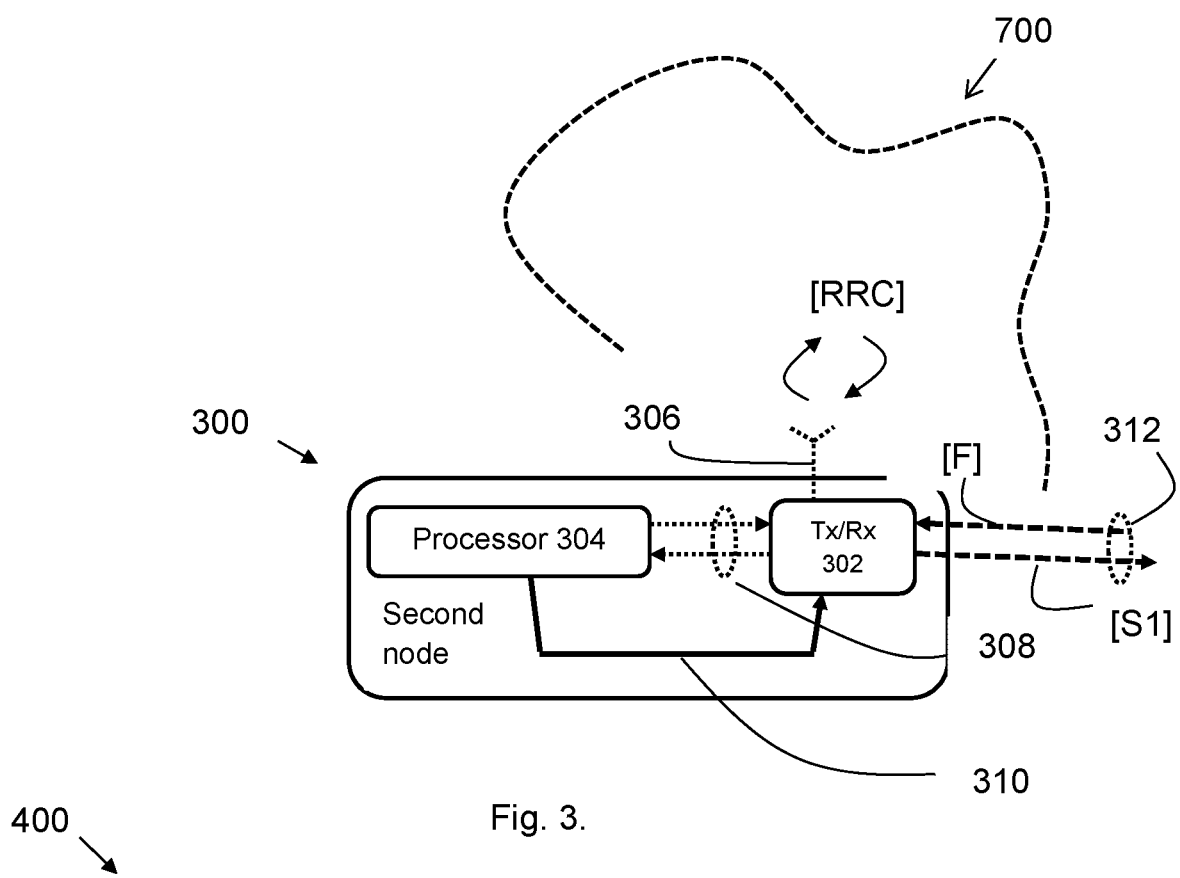
FIG. 3 shows a second network node according to an embodiment of the invention.

FIG. 3 shows a second network node 300 according to an embodiment of the invention. The second network node 300 comprises a processor 304 which is communicably coupled with communication means 308 to a transceiver 302 in this exemplary embodiment. The communication means 308 are illustrated as dotted arrows between the processor 304 and the transceiver 302 in FIG. 3. The communication means 308 are according to techniques well known in the art. The communication means 308 may e.g. be used for transfer of data or control signaling between the processor 304 and the transceiver 302. The second network node 300 in this particular embodiment further comprises control means 310 by which the processor 304 operates (or controls) the transceiver 302. The control means are illustrated with the black arrow from the processor 304 to the transceiver 302. The second network node 300 also comprises antenna means 306 coupled to the transceiver 302 for transmission in the wireless communication system 700. The second network node 300 may also optionally have wired communication means 312 by which the second network node 300 can communicate with other network nodes or other network entities. The wired communication means 312 may e.g. be part of a backhaul system of the wireless communication system 700.

According to the present solution, the second network node 300 is configured to have a RRC connection to a user device 500 (shown in FIGS. 5 and 7) of a wireless communication system 700. The transceiver 302 of the second network node 300 is configured to receive a data flow F comprising data packets addressed to the user device 500. In this particular example the data flow F is received via the wired communication means 312 e.g. from a core network. However, the data flow F could be received via a wireless communication protocol or a combination thereof.

The processor 304 of the second network node 300 is configured to determine at least one first sequence of data packets S1 of the data flow F addressed to the user device 500. The processor 304 is further configured to determine at least one first network node 100 configured to communicate with the user device 500 over at least two radio channels. The transceiver 302 of the second network node 300 is further configured to transmit the first sequence of data packets S1 to the first network node 100. The first sequence of data packets S1 is in this particular example transmitted via the wired transmission means 312 to the first network node 100. It is however noted that the first sequence of data packets S1 may also be transmitted via a wireless transmission protocol to the first network node 100 (not shown in FIG. 3).

Figure 4:
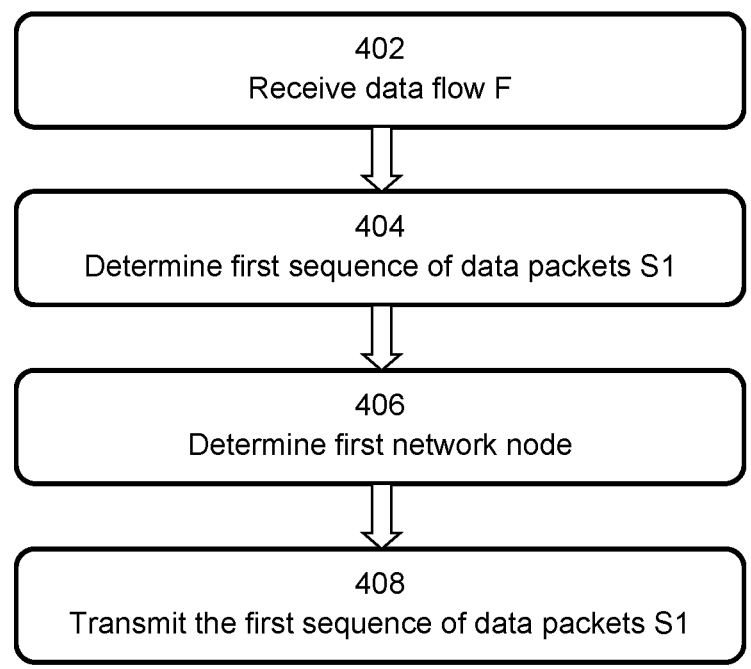
FIG. 4 shows another method according to an embodiment of the invention.

FIG. 4 shows a corresponding method which may be implemented in a second network node 300, such as the one shown in FIG. 3. The method 400 comprises the step of receiving 402 a data flow F comprising data packets addressed to the user device 500. The method 400 further comprises the step of determining 404 at least one first sequence of data packets S1 of the data flow F addressed to the user device 500. The method 400 further comprises the step of determining 406 at least one first network node 100 communicate with the user device 500 over at least two radio channels. The method 400 further comprises the step of transmitting 408 the first sequence of data packets S1 to the first network node 100 if the first network node 100 has at least two radio data links to the user device 500.

In one embodiment of the invention, the second network node 300 is configured to communicate with the user device 500 over one or more radio channels. Therefore, the second network node 300 is configured to determine at least one second sequence of data packets S2 of the data flow F addressed to the user device 500, and to transmit the second sequence of data packets S2 to the user device 500 in a third set of frequency resources over a third radio channel which is not the same as the first C11 or the second C12 radio channels.

Figure 5:
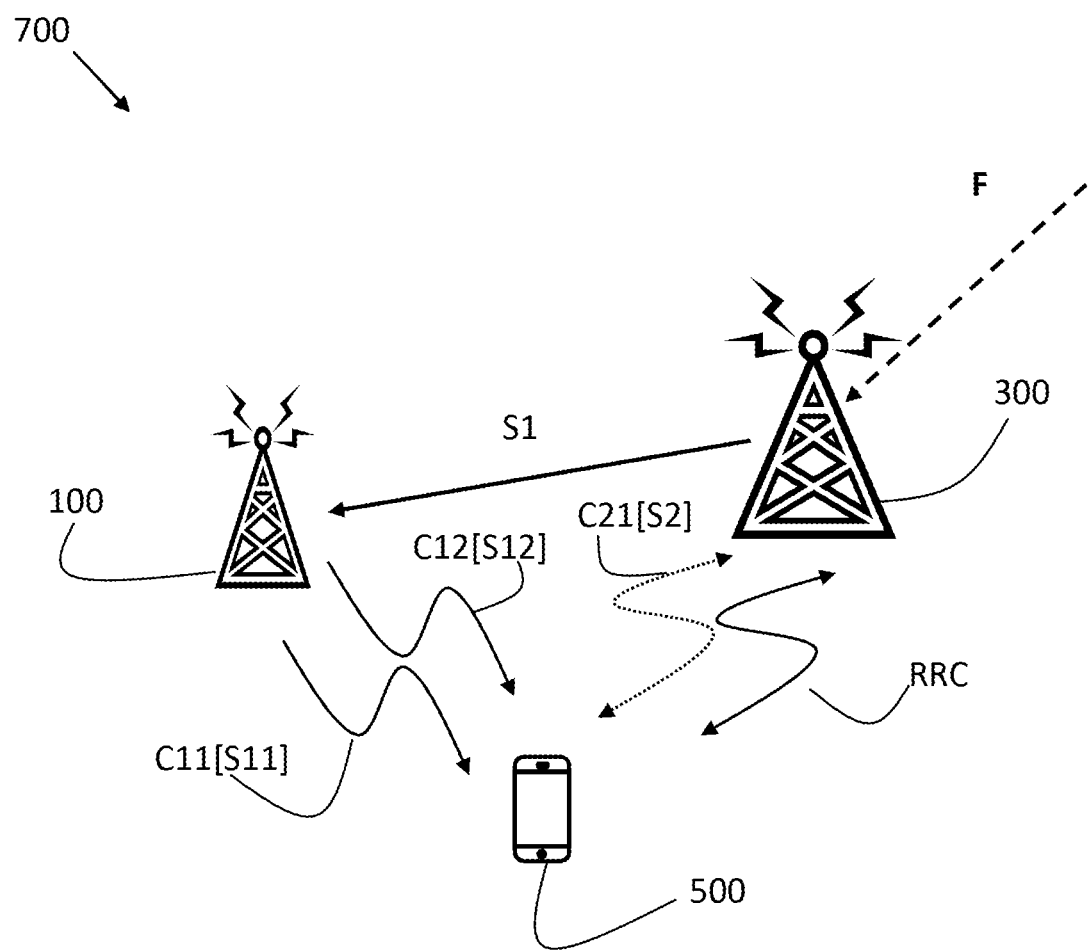
FIG. 5 illustrates a wireless communication system according to an embodiment of the invention.

FIG. 5 shows a wireless communication system 700 according to an embodiment of the invention. The wireless communication system 700 comprises at least one first network node 100 and at least one second network node 300 having at least one communication interface with the first network node 100. The first network node 100 is configured to receive a first sequence of data packets S1 from the second network node 300. After reception of S1, the first network node 100 splits the first sequence of data packets S1 into at least one first sub-sequence of data packets S11 and one second sub-sequence of data packets S12. Whilst the second network node 300 has a RRC connection to the user device 500, the first network node 100 transmit the first sub-sequence of data packets S11 in a first set of frequency resources over a first radio channel C11 and the second sub-sequence of data packets S12 in a second set of frequency resources over a second radio channel C12 to the user device 500. The first set of frequency resources and the second set of frequency resources are non-overlapping as described previously. Therefore, in one embodiment of the invention, the data flow F is addressed to the user device 500 and the user device is configured to have a RRC connection to the second network node 300. FIG. 5 further shows how the second network node 300 transmits a second sequence of data packets S2 of the data flow F to the user device over a third radio channel C21. The data flow F addressed to the user device may e.g. be transmitted from the core network (not shown in FIG. 5) to the second network node 300.

Figure 6:
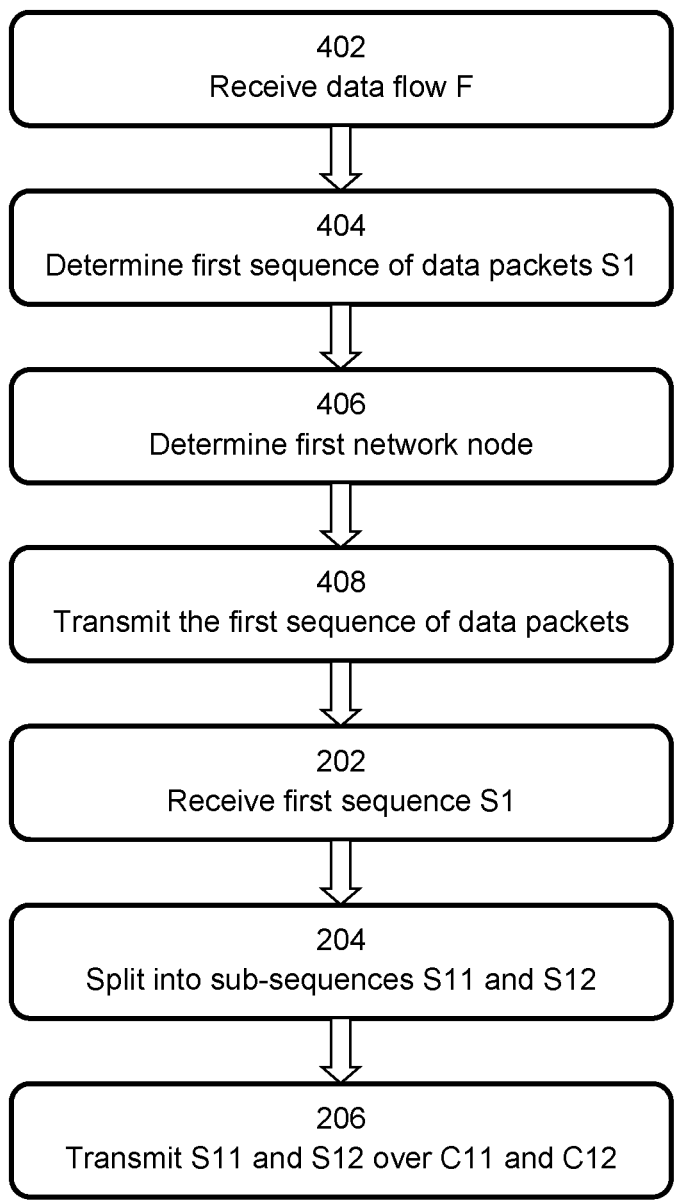
FIG. 6 shows another method according to an embodiment of the invention.

FIG. 6 shows a corresponding method 800 which may be implemented in a wireless communication system 700, such as the one shown in FIG. 5. The method 800 comprises the steps 402, 404, 406, 408, 202, 204 and 206 explained and described above.

Figure 7:
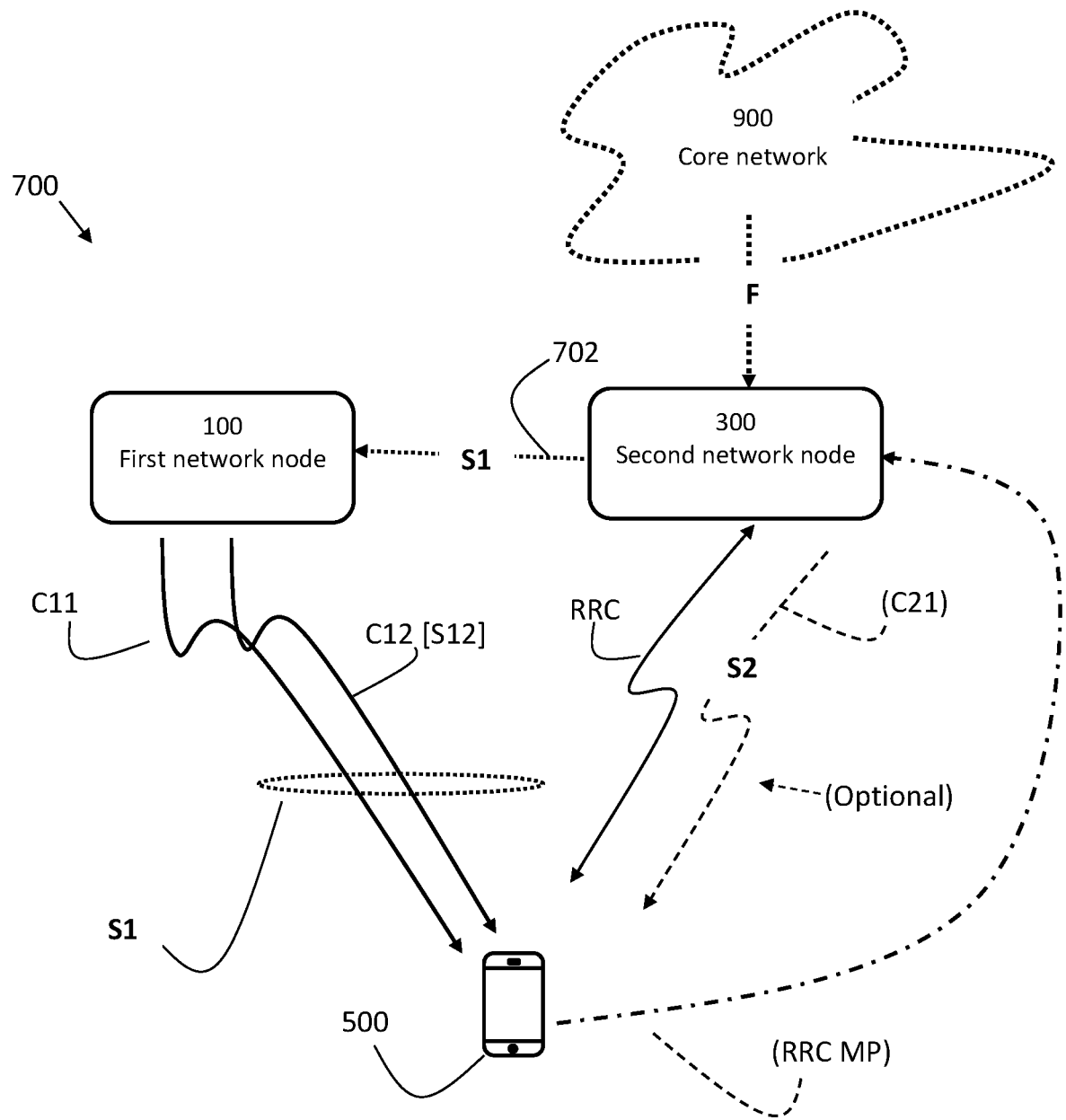
FIG. 7 illustrates a wireless communication system according to a further embodiment of the invention.

FIG. 7 shows a wireless communication system 700 according to a further embodiment of the invention. In this embodiment the second network node 300 receives the data flow F addressed to the user device 500 from a core network 900 which e.g. may be connected to the Internet via suitable gateways. In an embodiment of the invention, the first sequence of data packets S1 is only a fraction of all data packets of the data flow F.

The second network node 300 determines the first sequence of data packets S1 and transmits mentioned first sequence S1 to the first network node 100 via the backhaul link 702 shown in FIG. 7 (wired or wireless or a combination thereof). After splitting mentioned first sequence S1 the first network node 100 transmits the first sub-sequence of data packets S11 and the second sub-sequence of data packets S12 over respective radio channels C11 and C12.

In yet another embodiment of the invention, the transceiver 102 of the first network node 100 is configured to receive at least one RRC Measurement Report (MP) from the second network node 300. The RRC measurement report is associated with at least one radio channel between the user device 500 and the first network node 100. The processor 104 of the first network node 100 is configured to split the first sequence of data packets S1 based on the received RRC measurement report. In one exemplifying case, the first sequence of data packets S1 is split into at least one first sub-sequence of data packets S11 and one second sub-sequence of data packets S12 based on channel state information associated with at least one of the two radio channels between the first network node 100 and user device 500 as comprised in the received RRC measurement report.

Accordingly, the transceiver 302 of the second network node 300 is configured to receive at least one RRC measurement report from the user device 500 as illustrated in FIG. 7. The RRC measurement report should be associated with (or for) at least one radio channel between the user device 500 and the first network node 100. The transceiver 302 is further configured to forward the RRC measurement report to the first network node 100, e.g. the backhaul link 702.

In the following disclosure further exemplary embodiments of the invention are given in a combined inter-RAT LTE/WLAN context; hence the terminology used in these sections, such as UE (corresponding to the present user device 500) and eNB. For example, the first radio channel C11 uses a first RAT and the second radio channel C21 uses a second RAT. More particularly the first RAT operates in a licensed spectrum band and the second RAT operates in an unlicensed spectrum band, or vice versa, according to further embodiments of the invention. For example, the first RAT may be a 3GPP RAT and the second RAT is a WLAN, or vice versa. It is however realized by the skilled person that the present solution is not limited to the mentioned RATs and can be applied in other RATs and combinations of RATs. Other RATs may e.g. be Li-Fi (optical spectrum), Bluetooth, ZigBee, etc.

The present solution can generally be seen as a multi-connectivity network having triple or higher connectivity. This is e.g. applicable to the case when the user device 500 connects to the wireless communication system 700 with three communication links, of which two are co-located, over different radio channels. Co-located means they are in same physical box (e.g. a network node) or connected by an interface having latency less than a threshold, e.g. less than 1 ms which is aligned to that of 3GPP LWA as explained above. Triple (or higher) connectivity according to the present invention will give large benefits, compared to e.g. double connectivity or other solutions according to conventional solutions.

Figure 8:
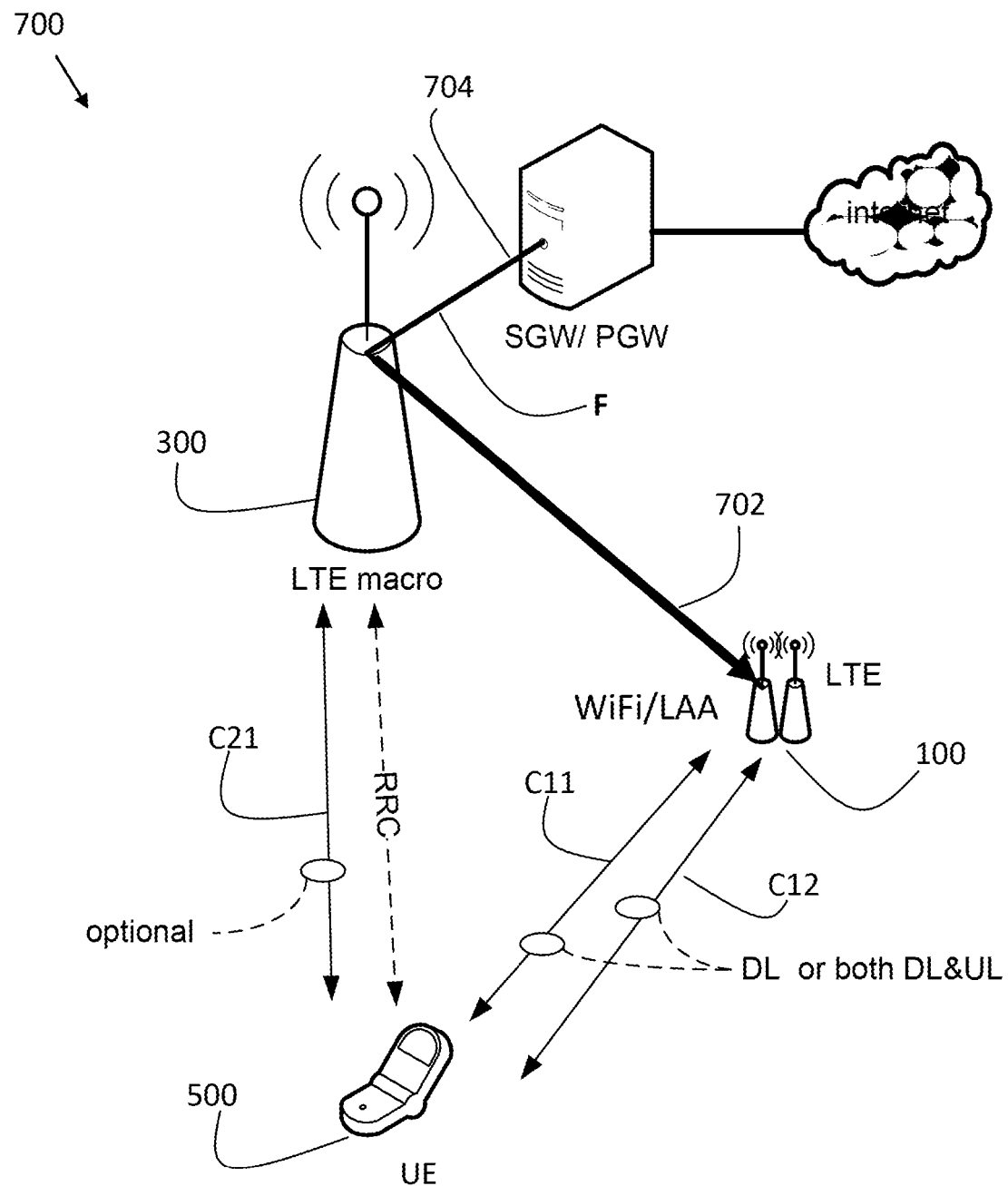
FIGS. 8-14 show yet further embodiments of the invention.

A triple connectivity scenario is illustrated in FIG. 8. It is to be noted that FIG. 8 is illustrated with a co-located LTE and WiFi/LAA node and a non-ideal backhaul link 702. The LTE macro node corresponds to the second network node 300 and the co-located LTE and WiFi node corresponds to the first network node 100 in this particular example. However, the WLAN cell could also be an LTE cell operating in unlicensed spectrum, for example, using a standalone LTE link over unlicensed spectrum (LTE-U), LAA or MuLTEfire cell. The RRC radio control connection (control plane) can be terminated at the macro layer so that wide-area mobility is improved. The user plane can exploit any of radio the two radio links over the radio channel C11 and C12 for downlink (DL) or uplink (UL) transmissions as shown in FIG. 8. Further, in FIG. 8 the user device 500 has also an optional radio link over the radio channel C21 for downlink (DL) or uplink (UL) transmissions to or from the LTE Macro node. However, each triple connectivity setup should have at least two radio links (for the data plane) and at least one RRC connection (for the control plane) in the same RAT or in different RATs according to the present solutions. The RRC connection between the user device 500 and the LTE macro node is also illustrated in FIG. 8. Additionally, the LTE macro node can be configured to transmit a second sequence of data packets S2 of the flow F to the user device 500 over a third radio link using a third radio channel C21 as described above. The flow F is in this example received from a gateway SGW/PGW (Serving Gateway/Packet Data Network Gateway) which in turn is connected to the internet. Thereby, at least three radio links for downlink (DL) or uplink (UL) transmission between the user device 500 and network nodes of the communication system 700 are in other words maintained using at least three radio channels operating at different frequencies with non-overlapping frequency resources.

As in LTE DC or LWA a bearer may be split across multiple radio links, including the usage where no data packets are sent over one link of a split bearer. This 0:100% split is beneficial in some circumstances. For example, it allows reduced delay jitter compared to when the bearer is split and both radio links are used, because the reordering at the user device 500 in the PDCP layer is not needed. Furthermore, the user plane can be effectively switched between radio links by changing the split ratio from 0:100 to 100:0 without needing to send a reconfiguration control message to the user device 500. This could be beneficial if the user device 500 moves or the loading on the cells supporting the two radio links changes (load balancing action is then needed). In the 0:100 split, the radio on the 0% link is still active, waiting to receive user plane transmissions (and e.g. decodes Physical Downlink Control Channel (PDCCH)).

Unlike the LWA co-located architecture of 3GPP R13, the interface to the core network, i.e. the interface 704 between an LTE eNB and the serving gateway (SGW) may be anchored at the macro node 300 in FIG. 8. Consequently, for the downlink, the LTE macro node being connected to the SGW/PGW can determine how to split a bearer between its own resources (macro cell link(s)) and the small cell co-located node.

Figure 9:
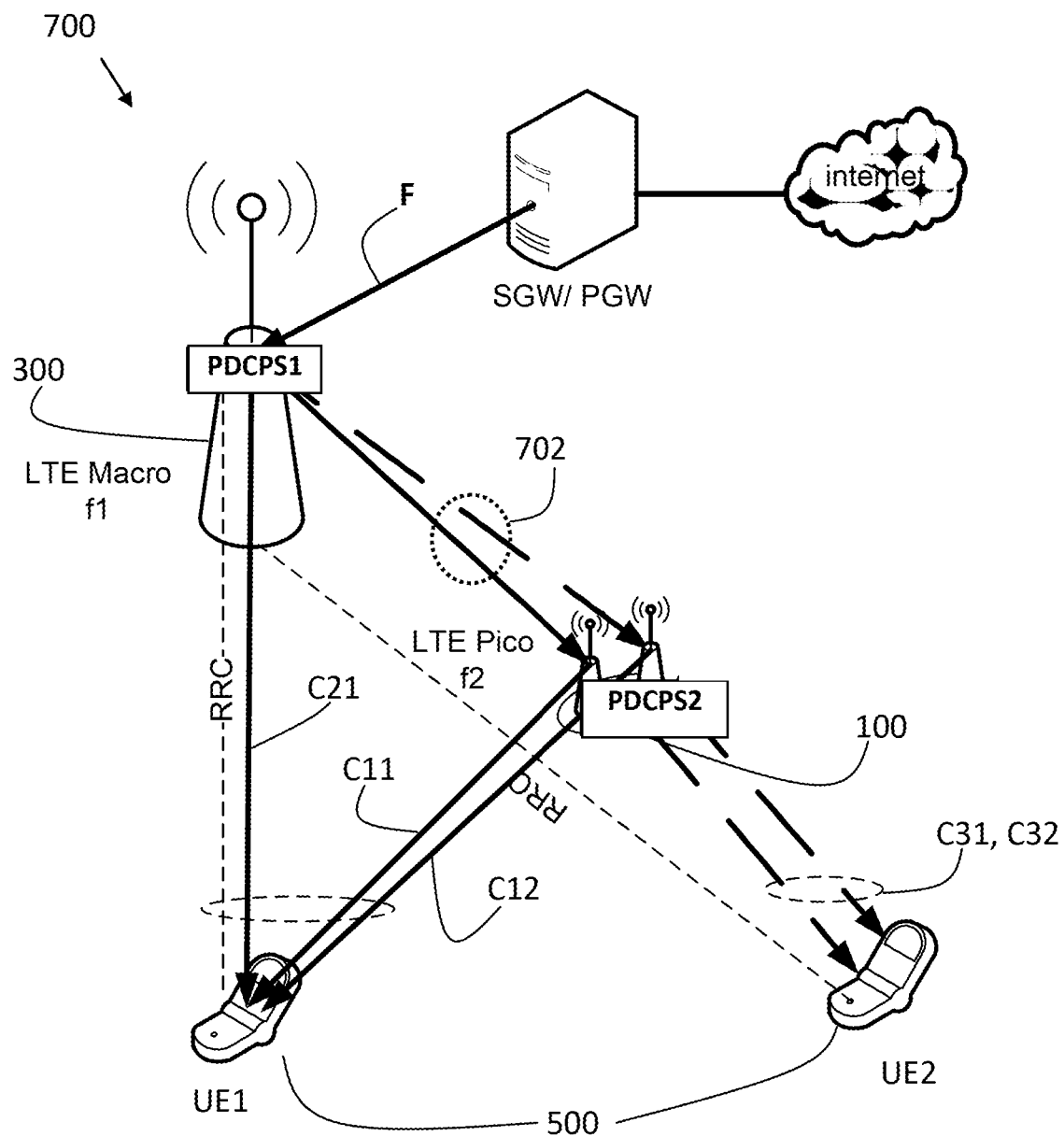

Another important aspect of embodiments of the invention is the location of the Packet Data Convergence Protocol (PDCP) scheduler elements. To maintain advantage of co-located operation (e.g. joint scheduling), the architecture employs separate PDCP schedulers for the LTE macro node (second network node 300 in this example) and the co-located small cell node comprising LTE pico node and a WiFi AP (first network node 100 in this example) which is illustrated in FIG. 9. Thus, whilst the LTE macro node (i.e. the second network node 300) determines the split between LTE macro node and co-located small cell node, the co-located small cell node (i.e. the first network node 100) is then responsible for subsequent splitting of the sequence of data packet S1. In effect there is a two level hierarchy of PDCP schedulers according to this embodiment.

In FIG. 9, UE1 has three downlink user plane radio links using radio channels C11, C12 and C13, respectively, wherein the radio links using the radio channels C11 and C12 are to the co-located small cell node (i.e. the first network node 100) while the radio link using the radio channel C13 is to the LTE macro node (i.e. the second network node 300). Further, UE2 has two downlink user plane radio links to the co-located small cell node using radio channels C31, and C32, respectively. The LTE macro node comprises a first PDCP scheduler PDCPS1 residing in the LTE macro node and is configured to send data packets from the macro cell to UE1 and forwards the rest of the data packets of the flow F over the backhaul link 702 to the co-located small cell node. The co-located small cell node comprises a LTE pico cell node and a WiFi AP. Here, at the co-located small cell node a second PDCP scheduler PDCPS2 residing in the co-located small cell node determines how to split these forwarded data packets S1 between the pico cell node and Wi-Fi AP radio links using the radio channel C31 and C32 and send them to UE1. The LTE macro node further determines that UE2 should not use the link from the LTE macro cell (for example, the link quality is too poor) and sends all data packets of the downlink bearer addressed to UE2 to the co-located small cell node over the backhaul link 702. The co-located small cell node then splits the downlink bearer addressed to UE2 between the pico cell node and the WiFi AP over the radio channels C31 and C32. It should be noted that the RRC connections are terminated at the LTE macro cell node for both UE1 and UE2, respectively, in the example in FIG. 9.

Furthermore, in FIG. 9 the WiFi is only operating in the downlink only as previously discussed. Consequently, the RRC signaling that carries information on the radio conditions of the UEs with respect to the WiFi is forwarded over the backhaul link 702 to the co-located small cell node, if the co-located small cell node is to exploit this information in its smart scheduling and load balancing (see FIG. 10). If this is not the case, the measurements of the WiFi radio conditions could be measured by the UEs and transmitted over the WiFi uplink (as MAC control elements) direct to the co-located small cell node. The following measurements could be used for smart scheduling and load balancing in the present solution, namely for WiFi: Received Signal Strength Indicator (RSSI), Received Channel Power Indicator (RCPI), and Received Signal to Noise Indicator (RSNI); and LTE: Received Signal Received Power (RSRP), and Received Signal Received Quality (RSRQ).

In particular, these measurements are useful to determine the proper amount of data to be transmitted over LTE and WLAN depending on the respective channel quality/state as well as depending on the corresponding load. It should be noted that other LTE measurements at layer 1/layer 2 are accessible directly by the co-located small cell node, for example Channel Quality Indicator (CQI).

Figure 10:
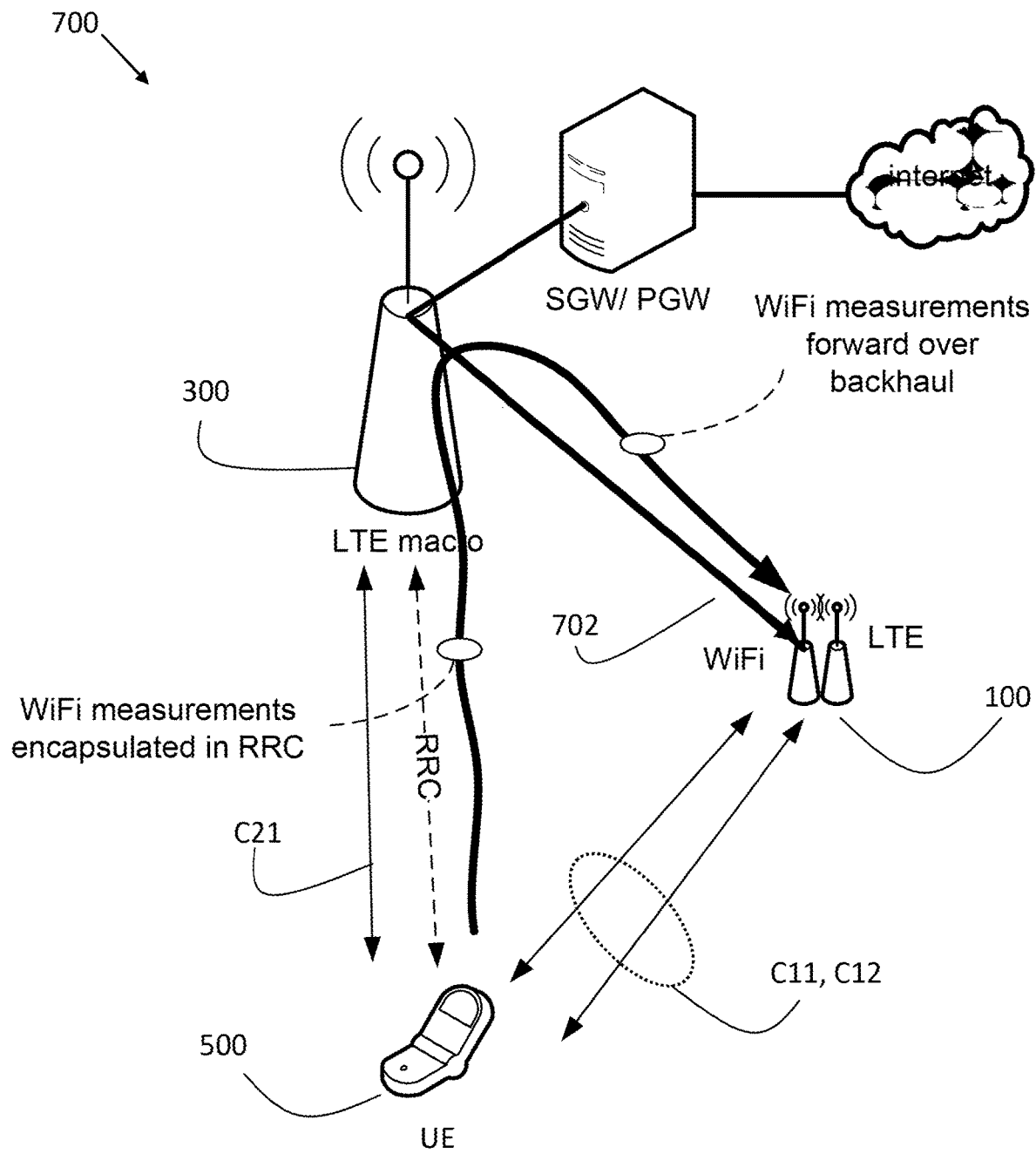

FIG. 10 shows a further embodiment of the invention. Here the architecture is similar to an LTE DC arrangement in which the user plane is terminated at the SeNB, but instead two distinctions are made:
1. The LTE macro node 300 terminating the RRC is connected by backhaul link 702 to a co-located node 100 (instead of an LTE SeNB in the prior art).
2. To assist the co-located node 100 to perform joint scheduling between the WLAN and LTE pico cells, RRC measurements carrying WLAN information can be forwarded over the backhaul link 702 from the LTE macro node to the co-located small cell node. The WiFi measurements have been sent from the UE encapsulated in the RRC measurements as illustrated in FIG. 10.

The LTE macro node is involved in the RRC establishment and bearer establishment. It needs to instruct the co-located node that it shall deliver the downlink bearer (split over the WLAN and pico cells, split ratio according to decision of the co-located node) and liase with the core network to establish the data path. When the UE moves, the LTE macro node recognizes the need to switch between co-located nodes (or another cell/node type) by analysis of received RRC measurements. The LTE macro node then instructs the UE (RRC reconfiguration) and instructs the current and future (post-switch) co-located small cell nodes. The advantages of the FIG. 10 architecture is that there is an anchored RRC at a LTE macro node (so good mobility performance without frequent handovers), whilst the user plane is delivered from a co-located small cell node close to the UE, giving high throughput. Furthermore, the co-located small cell node can perform joint scheduling with the advantages already discussed.

Figure 11:
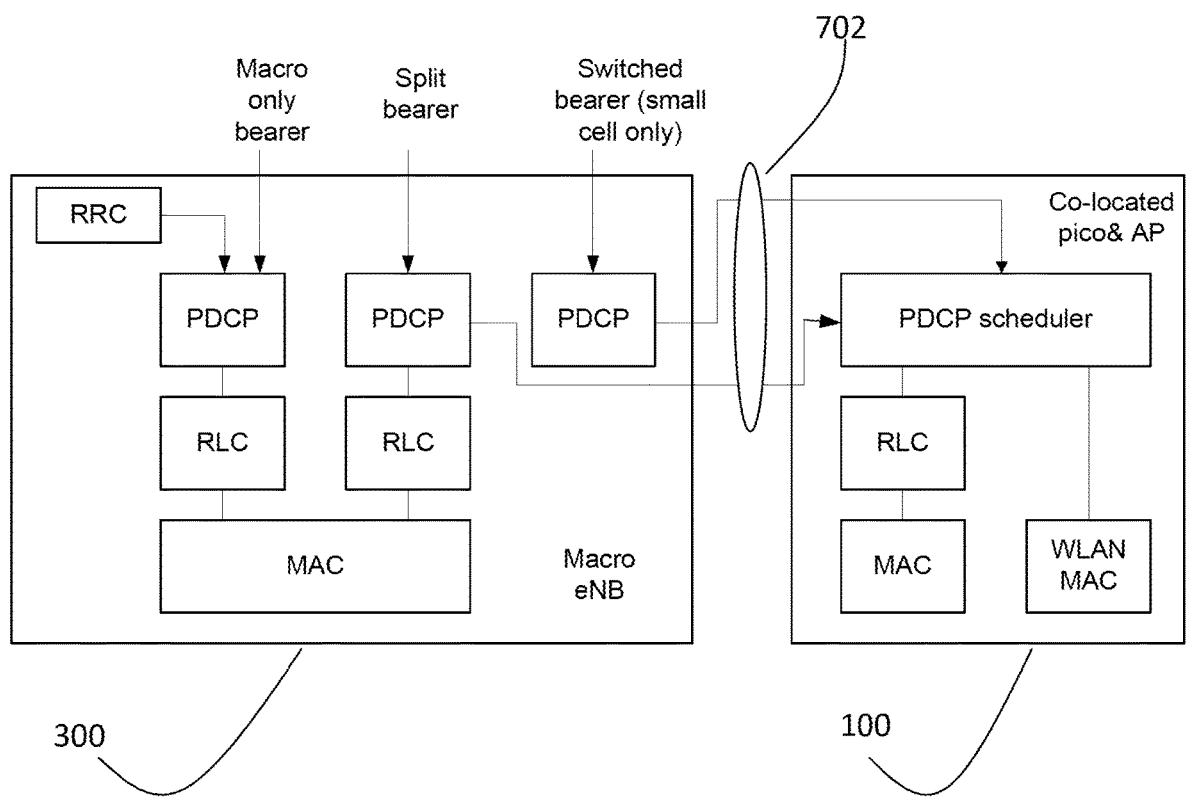

In FIG. 11 a network side protocol stack is shown for managing downlink bearers according to an embodiment of the invention. The RRC protocol use the LTE macro eNB layer 2 (and layer 1 which is not shown in FIG. 11) stack to communicate to the RRC peer in the UE (the UE is not shown in FIG. 11). The user plane bearers can be one of three types: i) macro only bearer; ii) split bearer; iii) switched bearer. The macro only bearer uses the macro eNB stack only as in a conventional approach (R8) for a UE connected to the macro cell (the second network node 300 in this example). The split bearer is split by the PDCP layer between a macro cell and the co-located pico node and AP (the first network node 100 in this example). In other words, the PDCP layer takes incoming data packets (over the S1 interface) and creates PDCP PDUs, some of which are passed downwards into the macro eNB Radio Link Control (RLC), others are passed over the backhaul 702 interface to the co-located node. At the co-located node the PDCP scheduler then determines which PDCP PDUs should be sent over the LTE interface (passed to the LTE RLC) and which should be sent over WLAN (passed to WLAN MAC). For the switched bearer, all incoming data packets are mapped to PDCP PDUs and sent to the co-located node. Here the data packets are handled in a similar fashion as described for the split bearer.

Figure 12:
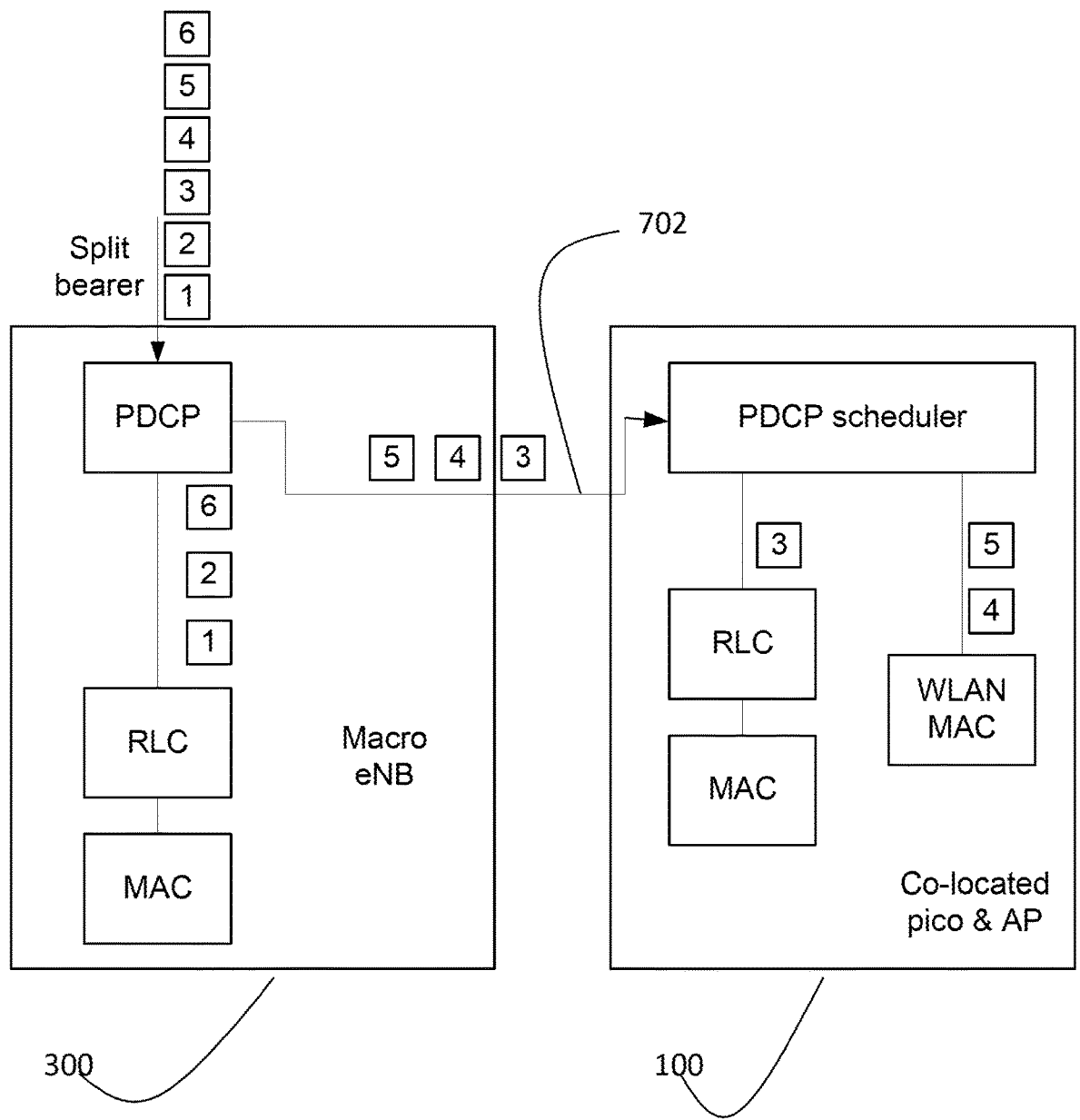

In FIG. 12 another example of the operation of a PDCP scheduler according to the invention is shown. Data packets labeled 1 to 6 arrive over the interface from the core network (e.g., from the SGW/PGW) into the LTE macro eNB (the second network node 300 in this example). The PDCP scheduler decides to send packets 1, 2 and 6 over the macro cell, and forwards the other data packets 3, 4 and 5 over the backhaul 702 to the co-located pico and AP (the first network node 300 in this example). The co-located pico and AP node decides to send data packet 3 over LTE (the pico cell) and the other two data packets 4 and 5 over the AP. At the UE side (not shown in FIG. 12), the arrival of data packets out-of-sequence is handled by the PDCP layer (re-ordering function). The data packets numbers can be considered to be the PDCP PDU sequence numbers. There is no segmentation of packets by the PDCP layer in this case.

Figure 13:
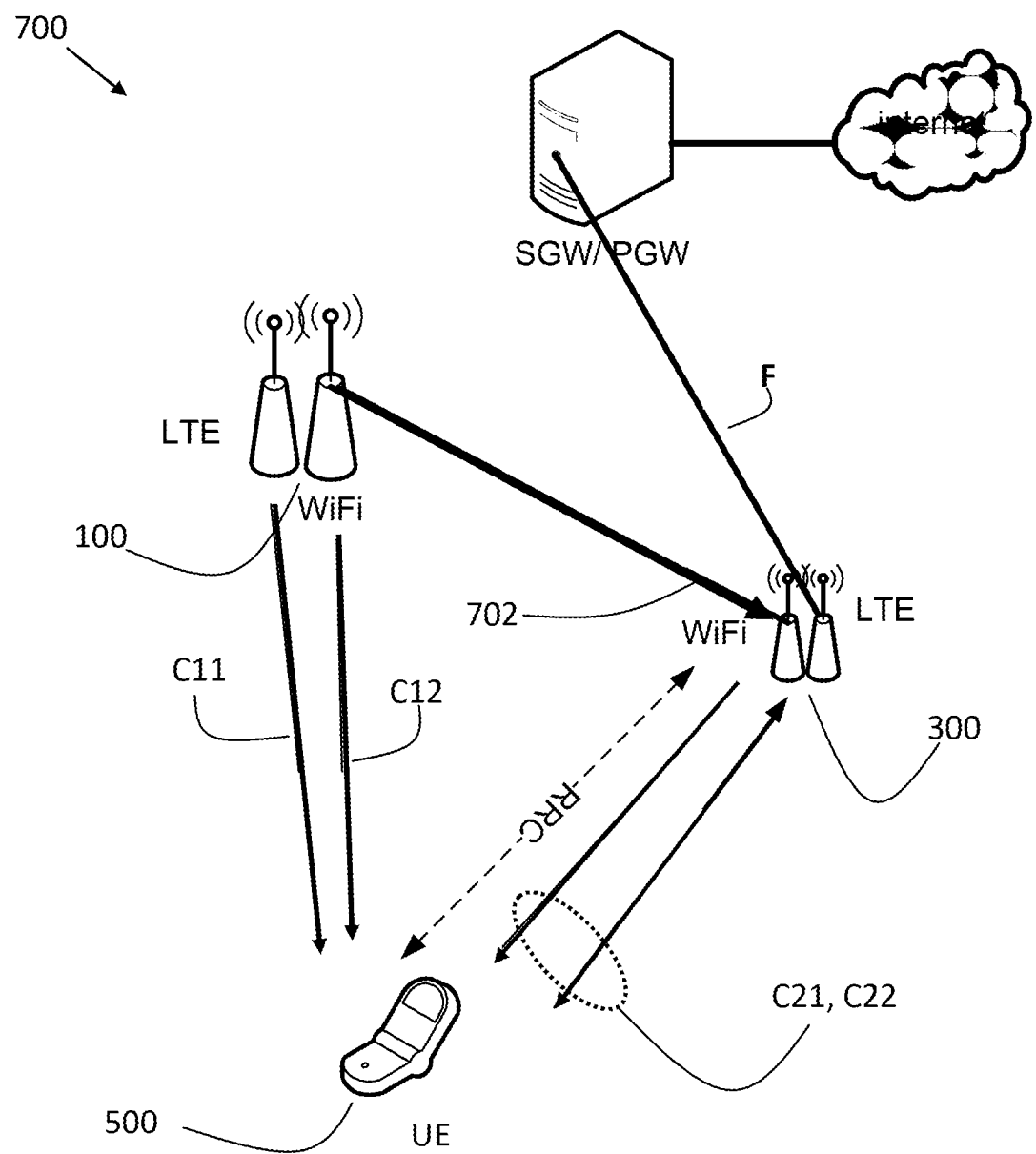

FIG. 13 shows a co-located small cell node (the second network node 300 in this example) comprising a LTE pico node and a WiFi AP. In this example, the RRC connection is terminated at a co-located small cell node which also receives the flow F addressed for the UE from the gateway SGW/PGW. FIG. 13 also shows another co-located macro node comprising a LTE macro node and a WiFi AP (corresponding to the first network node 100). The co-located macro node has two radio links to the UE for the user plane using respectively the radio channels C11 and C12. Further, the co-located small cell node has two radio links to the UE for the user plane using respectively the radio channels C21 and C22. Hence, a quadruple connectivity is illustrated in FIG. 13. This solution allows greater throughput for UEs on the boundary between the coverage of the co-located cells.

Figure 14:
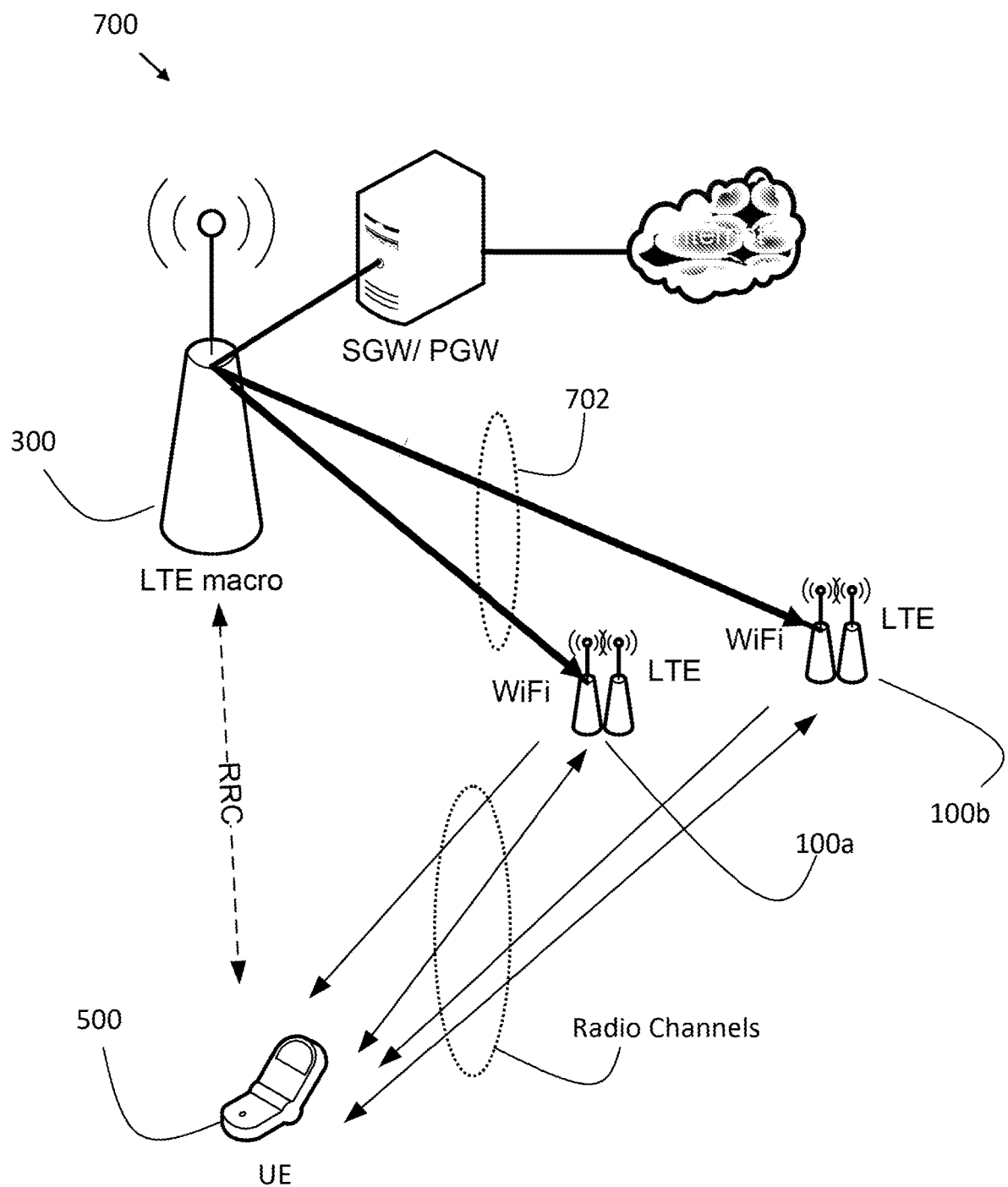

FIG. 14 shows the case when the LTE macro node (i.e. the second network node 300) acts as an RRC anchor for the two co-located small cell nodes 100a and 100b, respectively. The UE is served by the two separate co-located small cell nodes 100a, 100b and maintains the RRC connection to the LTE macro node. This gives benefits for UEs located in the overlap region between the cells of the two co-located small cell nodes 100a, 100b. Since the co-located small cell nodes 100a, 100b have much smaller coverage than the LTE macro cell because of reduced transmission power, they can be densely packed with many (e.g. 5-10) co-located nodes per macro cell. The UE has a plurality of radio links for the data plane to the co-located small cell nodes 100a, 100b in the example in FIG. 14.

The present first network node 100 and the second network node 300 may be a (radio) network node or an access node or an access point or a base station, e.g., a Radio Base Station (RBS), which in some networks may be referred to as transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

Furthermore, any methods according to embodiments of the invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the network nodes comprise communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), mixed signal devices (MSDs), trellis coded modulation (TCM) encoder, TCM decoder, power supply units, power feeders, communication interfaces, communication protocols, etc. which are suitably arranged together for performing the present solution.

Especially, the processors of the present network node may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

Additionally, statements made herein characterizing the invention refer to an embodiment of the invention and not necessarily all embodiments.

What is claimed is:

1. A wireless communication system comprising:
a first network node; and
a second network node;
wherein the second network node is configured to have a Radio Resource Control (RRC) connection to a user device;
wherein the second network node comprises:
a transceiver configured to receive a data flow comprising data packets addressed to the user device; and
a processor configured to determine at least one first sequence of data packets of the data flow addressed to the user device, and determine that the first network node is configured to communicate with the user device over at least two radio channels;
wherein the transceiver is further configured to transmit the at least one first sequence of data packets to the first network node if the first network node has at least two radio channels for communication with the user device;
wherein the first network node comprises:
a transceiver configured to receive, from the second network node, the at least one first sequence of data packets and at least one RRC measurement report, the at least one RRC measurement report being associated with at least one radio channel between the user device and the first network node; and
a processor configured to split, based on the at least one received RRC measurement report, the at least one first sequence of data packets into at least a first sub-sequence of data packets and a second sub-sequence of data packets;
wherein the transceiver is further configured to transmit the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

2. A first network node for a wireless communication system, comprising:
a transceiver configured to receive, from a second network node, a first sequence of data packets of a data flow addressed to a user device and at least one Radio Resource Control (RRC) measurement report, the at least one RRC measurement report being associated with at least one radio channel between the user device and the first network node; and
a processor configured to split, based on the at least one received RRC measurement report, the first sequence of data packets into at least a first sub-sequence of data packets and a second sub-sequence of data packets;
wherein the transceiver is further configured to transmit the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

3. The first network node according to claim 2, wherein the data flow is addressed to the user device, wherein the user device is configured to have an RRC connection to the second network node.

4. The first network node according to claim 2, wherein the first sequence of data packets is a fraction of all data packets of the data flow.

5. The first network node according to claim 2, wherein splitting the first sequence of data packets comprises splitting all data packets of the first sequence of data packets into either the first sub-sequence of data packets or the second sub-sequence of data packets.

6. The first network node according to claim 2, wherein the transceiver is further configured to transmit the first sub-sequence of data packets using a first Radio Access Technology (RAT) over the first radio channel and the second sub-sequence of data packets using a second RAT over the second radio channel.

7. A method, comprising:
receiving, by a second network node of a wireless communication system, a data flow comprising data packets addressed to a user device, wherein the second network node has a Radio Resource Control (RRC) connection to the user device;
determining, by the second network node, at least one first sequence of data packets of the data flow addressed to the user device,
determining, by the second network node, that a first network node of the wireless communication system is configured to communicate with the user device over at least two radio channels;
transmitting, by the second network node, the at least one first sequence of data packets to the first network node based on the first network node having at least two radio channels for communication with the user device;
receiving from the second network node, by the first network node, the at least one first sequence of data packets and at least one RRC measurement report, the at least one RRC measurement report being associated with at least one radio channel between the user device and the first network node;
splitting, by the first network node, based on the at least one received RRC measurement report, the at least one first sequence of data packets into at least a first sub-sequence of data packets and a second sub-sequence of data packets; and transmitting, by the first network node, the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

8. A method, comprising:

receiving from a second network node, by a first network node configured to communicate with a user device over at least two radio channels, a first sequence of data packets of a data flow addressed to the user device and at least one Radio Resource Control (RRC) measurement report, the at least one RRC measurement report being associated with at least one radio channel between the user device and the first network node;

splitting, by the first network node, based on the at least one received RRC measurement report, the first sequence of data packets into at least a first sub-sequence of data packets and a second sub-sequence of data packets; and transmitting, by the first network node, the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

9. A non-transitory computer-readable medium having processor-executable instructions stored thereon, wherein the processor-executable instructions, when executed, facilitate performance of the following:

receiving, by a second network node of a wireless communication system, a data flow comprising data packets addressed to a user device, wherein the second network node has a Radio Resource Control (RRC) connection to the user device;

determining, by the second network node, at least one first sequence of data packets of the data flow addressed to the user device, determining, by the second network node, that a first network node of the wireless communication system is configured to communicate with the user device over at least two radio channels;

transmitting, by the second network node, the at least one first sequence of data packets to the first network node if the first network node has at least two radio channels for communication with the user device;

receiving from the second network node, by the first network node, the at least one first sequence of data packets and at least one Radio Resource Control (RRC) measurement report, the at least one RRC measurement report being associated with at least one radio channel between the user device and the first network node;

splitting, by the first network node, based on the at least one received RRC measurement report, the at least one first sequence of data packets into at least a first sub-sequence of data packets and a second sub-sequence of data packets; and transmitting, by the first network node, the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

10. A non-transitory computer-readable medium having processor-executable instructions stored thereon, wherein the processor-executable instructions, when executed, facilitate performance of the following:

receiving from a second network node, by a first network node configured to communicate with a user device over at least two radio channels, a first sequence of data packets of a data flow addressed to the user device and at least one Radio Resource Control (RRC) measurement report, the at least one RRC measurement report being associated with at least one radio channel between the user device and the first network node;

splitting, by the first network node, based on the at least one received RRC measurement report, the first sequence of data packets into at least a first sub-sequence of data packets and a second sub-sequence of data packets; and transmitting, by the first network node, the first sub-sequence of data packets in a first set of frequency resources over a first radio channel and the second sub-sequence of data packets in a second set of frequency resources over a second radio channel to the user device, wherein the first set of frequency resources and the second set of frequency resources are non-overlapping.

* * * * *